United States Patent

[11] 3,611,365

| [72] | Inventors | Stig Adolf Svante Lundquist |
| | | Husbyborg; Uppsala; |
| | | Victor Scuka, Uppsala, both of Sweden |
| [21] | Appl. No. | 805,157 |
| [22] | Filed | Mar. 7, 1969 |
| [45] | Patented | Oct. 5, 1971 |
| [73] | Assignee | Nitro Nobel AB |
| | | Gyttorp, Sweden |
| [32] | Priority | Mar. 18, 1968 |
| [33] | | Sweden |
| [31] | | 3517/68 |

[54] THUNDERSTORM WARNING SYSTEM
10 Claims, 4 Drawing Figs.

[52] U.S. Cl. .................................................. 340/421,
73/170, 250/83.3, 250/206, 324/72, 340/227, 340/420
[51] Int. Cl. ....................................................... G01w 1/02,
G01w 1/16, G08b 19/00
[50] Field of Search ........................................... 340/227,
228 S, 228, 421, 220, 420, 213; 73/170; 356/72;
250/83.3 IR, 206; 324/72

[56] References Cited
UNITED STATES PATENTS

| 1,919,215 | 7/1933 | Gunn | 324/72 |
| 2,953,020 | 9/1960 | Hunt | 73/170 |
| 3,141,330 | 7/1964 | Murray et al. | 73/170 X |
| 3,245,078 | 4/1966 | Kohl | 73/170 X |
| 3,336,798 | 8/1967 | Twohey | 73/170 |
| 3,344,344 | 9/1967 | Wales, Jr. | 324/72 X |
| 3,402,296 | 9/1968 | Benedict et al. | 250/83.3 H |
| 3,465,245 | 9/1969 | Fischer et al. | 324/72 |
| 3,465,339 | 9/1969 | Marner | 73/170 X |
| 3,475,963 | 11/1969 | Astheimer | 250/83.3 H X |

Primary Examiner—John W. Caldwell
Assistant Examiner—Scott F. Partridge
Attorney—Sughrue, Rothwell, Mion, Zinn & Macpeak ABSTRACT: A thunderstorm warning system wherein signals from various detectors individually providing representations of (1) the quasistatic electric field occuring between the electric charges of a thundercloud and ground and of (2) radiofrequency radiation pulses within the longwave radiofrequency spectral range that are transmitted from lightning discharges in fully developed thunderstorms and, if desired, of (3) pulses in another spectral range, preferably the optical range, are combined in an electronic logic system so as to result in a visible or audible alert or alarm indication, respectively, under specific predetermined conditions.

THUNDERSTORM WARNING SYSTEM

BACKGROUND OF THE INVENTION

1. Field of the Invention

In various connections, perhaps primarily in working with explosives, there is a great need of an objective method of predicting the outbreak of a thunderstorm with a reasonable time margin so that various measures for preventing damage and injuries, primarily evacuating personnel, may be taken. The instant invention discloses a method of this kind and a device for performing the same.

2. Description of the Prior Art

In known thunderstorm warning systems, on one hand the quasistatic electric field occurring between the electric charges of a thundercloud and ground and on the other hand the pulses of electromagnetic radiation within the longwave radiofrequency spectral range that are transmitted from lightning discharges in fully developed encompassing thunderstorms are detected. After amplification the measuring signals from these detectors are caused individually to trigger visible or audible signals, wherein it has proved to be appropriate to have two threshold steps, alert and alarm, respectively, thereby making it possible to discontinue critical jobs that for instance may increase the danger of an explosion and to prepare for evacuation in response to the alert signal, whereas the safeguarded area is immediately and unconditionally evacuated in response to the alarm signal. For detecting the radiation pulses these known systems utilize an antenna wire suspended in conventional manner and having a considerable length, namely of the order of a few tens of meters. An obvious disadvantage in this method lies in the increased danger of lightning strokes in the apparatus that the antenna wire produces. Another weakness in these known devices has turned out to be their sensitivity to disturbances not only from occasional remote flashes of lightning but also from radiation sources in their vicinity, for instance machines producing spark discharges.

SUMMARY OF THE INVENTION

The deficiencies mentioned above are reduced to a high degree by means of the instant invention. This has been achieved by the measuring signals from different detectors being combined in an electronic logic system in such manner that the function of the alarm circuit may be triggered by radiofrequency radiation pulses, solely if these are repeated within a predetermined time interval or are combined with simultaneous pulses in another, preferably optical, spectral range or with a quasistatic electric field having a predetermined intensity level. In addition to being triggered by these combinations the alarm function is also triggered solely in response to said electric field exceeding a predetermined higher level. In a practical embodiment the field detector may appropriately consist of a capacitor and a rotatable diaphragm positioned in front of said capacitor and operating in accordance with the so-called field mill principle, with said diaphragm being disposed within an antenna for the longwave radiofrequency radiation pulses that is specifically designed for this purpose. This detector system designed as a unit has dimensions that merely correspond to normal body height. This results in a substantially decreased danger of lightning strokes in the apparatus and advantages in relocating as compared to the prior art devices disclosed above having separate, conventional longwave antennas.

Utilizing other spectral ranges than the longwave radiofrequency range as mentioned above comprises a substantial improvement which has been made possible by the invention. In the optical range, a great portion of the lightning discharges are concealed, as the occur within or between clouds. Hence, this range cannot be used as the only information for triggering an alarm in response to radiation pulses. However, by means of the invention the light from unobscured flashes of lightning, particularly the earth lightning flashes that are interesting from the warning viewpoint, may be utilized as excess information, resulting in an alarm being triggered by one single pulse if the latter is represented in both the optical and the radio frequency spectral range. The total function security of the system is increased hereby. In consequence of collecting repeated pulses within a predetermined time interval as mentioned above it has also become possible to utilize those pulses or pulse trains within the microwave range that precede lightning discharges. If so, these pulses must of course be detected by a specific microwave antenna, a so-called noise detector.

In practice it has now been found to be appropriate to design devices for applying the invention in a number of embodiments of different sophistication with respect to the sphere of application in concern. For small, mobile, field operating units it is appropriate to make use of the most simple standard design, wherein the detector system consists of the above-mentioned easily movable unit of field detector and long wave antenna. For large permanent establishments, such as factories and mines, the standard design may be expanded with the above-mentioned noise detector or optical detectors by means of a simple supplementing system.

The means that are necessary for achieving the objects set forth by the invention are disclosed in the claims following upon this description

BRIEF DESCRIPTION OF THE DRAWINGS

The invention will now be described more specifically with reference to the accompanying drawings, in which.

DESCRIPTION OF THE PREFERRED EMBODIMENTS

Figure 1:
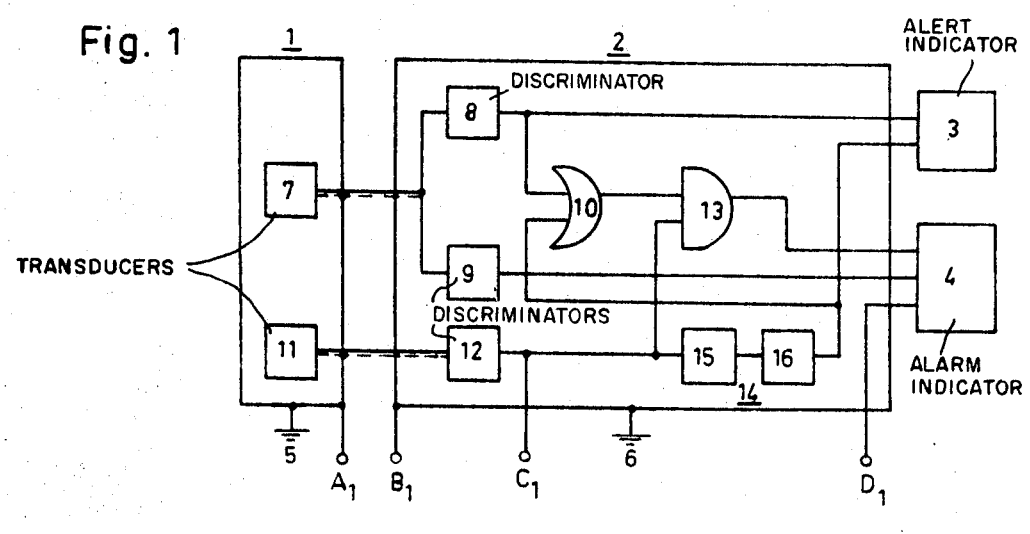
FIG. 1 shows a block diagram of a basic embodiment in accordance with the invention.
Figure 3:
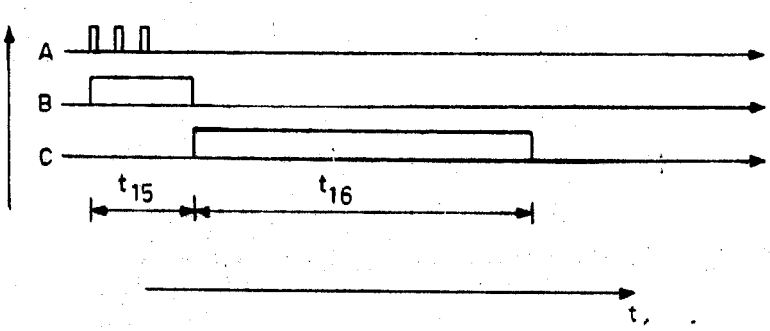
FIG. 3 shows a time diagram for signal voltages at predetermined locations in the block diagram of FIG. 1.

The block diagram illustrated in FIG. 1 merely has the purpose of illustrating the principles of the invention, and such conventional components as means for current supply, spare battery for current interruption, band-pass filters, amplifier circuits, etc. have been excluded. A detector unit 1 is connected to an electronic unit 2 means of shielded cables, from which the latter unit a warning circuit 3 may be actuated and an alarm circuit 4 may be triggered. The ground connection 5 of said detector unit must be attached to a separate ground terminal in the earth at the place where said unit is located, as not only may the network system ground 6 lead in disturbances from the network to the unamplified measuring signals but it may indicate to the detectors of the detector unit 1 inaccurate ground potential and effective antenna height as well. One of these detectors comprises a device 7 which will be disclosed more specifically below and from which a measuring signal proportional to the measuring signal of the quasistatic electric field will be obtained, for instance a sinusoidal voltage of 200 cycles per second, with said proportional measuring signal being branched to two parallel amplitude discriminators 8 and 9, respectively, having different threshold value levels, These may for instance be selected such, that an output signal will be produced by the discriminator 8 having the lower level with field intensities exceeding 1 kilovolt per meter, whereas the discriminator 9 will not produce an output signal until the threshold value of 2 kilovolts per meter is exceeded. An output signal from discriminator 8 is branched on one hand to the warning circuit 3 so as to retain the latter activated during a period of time determined by the quasistatic electric field and on the other hand to one input of an OR circuit 10. An output signal from discriminator 9 triggers the alarm circuit 4, which is not inactivated as the result of the signal from the discriminator ceasing but which must be cut off manually. When lightning discharges occur, the radiofrequency radiation detector 11 provides pulses that are introduced into a discriminator 12. The detector 11 may for example comprise a wide-band low frequency receiver, and the discriminating level may for instance correspond to a normal flash of lightning at a distance of 10–15 kilometers. A radiation pulse exceeding this energy provides a signal pulse from discriminator 12, with said signal pulse being branched off on one hand to an AND circuit 13 and on the other hand to a time circuit 14 consisting of two monostable multivibrators, so-called mono flip-flop circuits 15 and 16, respectively, connected in series, with the output signals of said multivibrators having durations corresponding with the respective time periods $t_{15}$ and $t_{16}$ of FIG. 3 after the actuation of said vibrators. Flip-flop circuit 15 is set by said signal pulse from discriminator 12, whereas flip-flop circuit 16 is set by the trailing edge of the output signal of flip-flop circuit 15. The signals mentioned above are illustrated in FIG. 3, with V designating the signal voltage and $t$ designating the time period. The narrow rectangles on line A represent the output signals from discriminator 12, the rectangle on line B has a length corresponding to time period $t_{15}$ and represents the output signal from flip-flop circuit 15, and the rectangle on line C has a length corresponding to time period $t_{16}$ and represents the output signal from flip-flop circuit 16. An output signal from flip-flop circuit 16 is branched off on one hand to warning circuit 3, thereby keeping the latter activated during the time period $t_{16}$, and on the other hand to the second input of said OR circuit, the output of which is connected to the second input to said AND circuit 13. An output signal from AND circuit 13 triggers alarm circuit 4, and hence this occurs not only if the signal pulse is transmitted from discriminator 12 during the time period in which discriminator 8 produces a signal but also if two consecutive signal pulses from discriminator 12 occur with a time interval that is greater than $t_{15}$ but smaller than $t_{15}+t_{16}$. The purpose of this time interval is to provide an indication of one signal pulse, either with rapidly repeated pulses or pulse trains originating in the same or interrelated discharge sequences in a thundercloud or disturbance sources or with pulses having so great a spacing in time that in all probability they do not emanate from a fully developed thunderstorm. In an embodiment utilized in practice $t_{15}$ was chosen equal to 2 seconds and $t_{16}$ was chosen equal to 100 seconds, as this has proved to be appropriate for Nordic conditions. For use in more southern areas having more intensive thunderstorms the time circuit may be replaced by a circuit having other characteristics.

As has been mentioned, the embodiment disclosed above may be supplemented by other detectors so as to create more sophisticated embodiments. Thus the longwave detector 11 may be replaced by a so-called noise detector.

Figure 2:
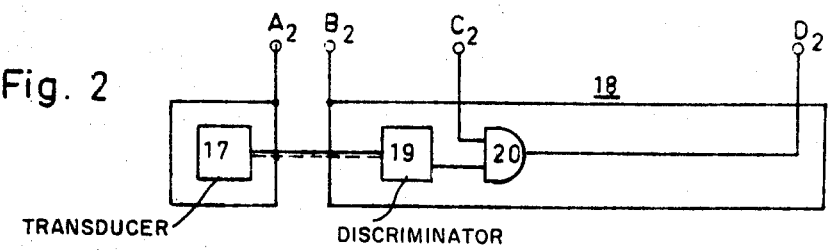
FIG. 2 shows a block diagram of circuits supplementary to the embodiment of FIG. 1.

Furthermore, the disclosed embodiment may be expanded with an optical detector, wherein the electronic logic system of FIG. 1 is additionally provided with a supplementary unit 18 in accordance with FIG. 2 by interconnecting the points $A_1$–$A_{2a}$, $B_1$–$B_2$, $C_1$–$C_2$ and $D_1$–$D_2$, respectively. In FIG. 2 the designation 17 refers to an optical detector, which for example may comprise a so-called all-sky light detector. By means of a shielded cable, detector 17 is connected to the discriminator 19 of supplementary unit 18, with said discriminator providing an output signal when the light intensity of a flash of lightning exceeds a predetermined threshold value. With simultaneous signal pulses from the respective discriminators 12 and 19, AND circuit 20 produces a signal pulse for triggering alarm circuit 4.

Figure 4:
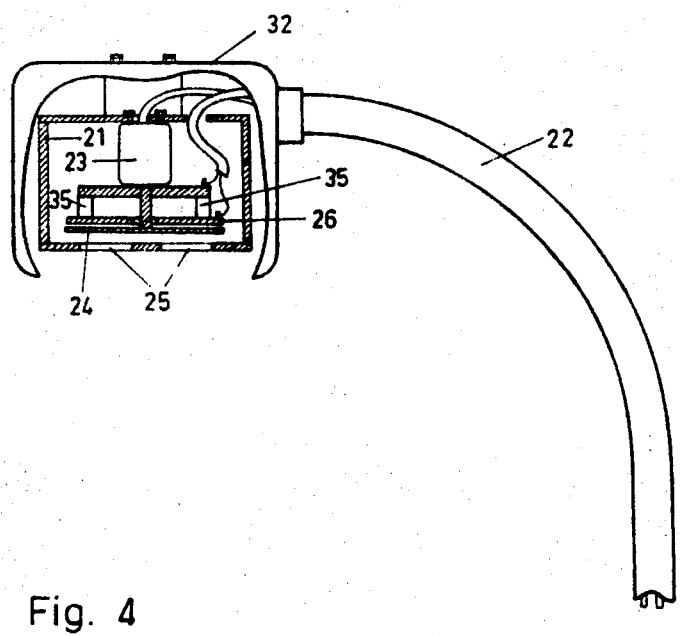
FIG. 4 shows an example of a detector unit designed in accordance with the invention.
Figure 4:
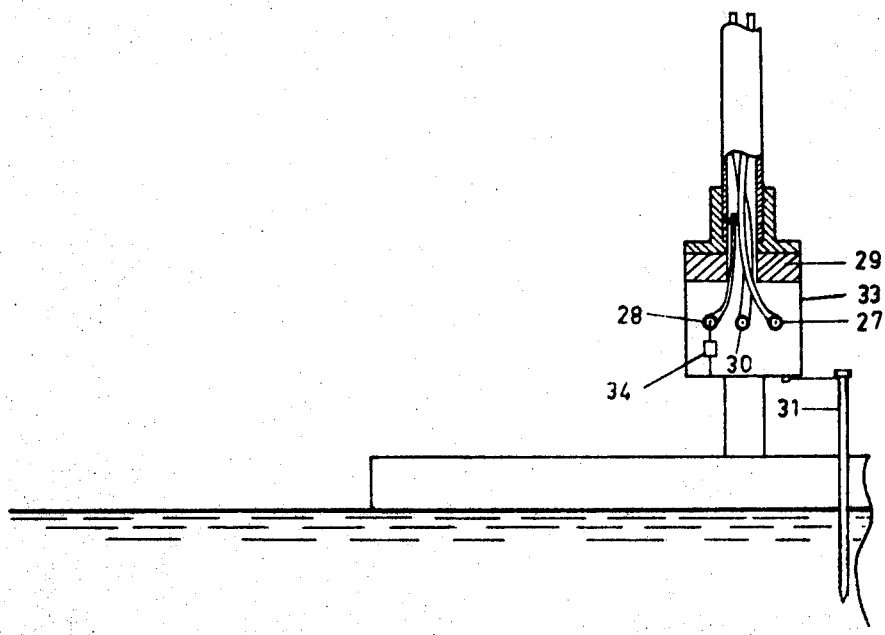

Detector unit 1, which was mentioned by way of introduction and which is utilized in the basic embodiment and is designed in accordance with the so-called field mill principle, is illustrated in FIG. 4, with the designation 21 referring to a grounded shield for the plate of capacitor 26, which latter is suspended and insulated in a metal casing 32. Said metal casing 32 is connected to an antenna pipe 22 and forms a part of the antenna. In the interior of shield 21 an electric motor 23 rotates a grounded rotatable diaphragm 24 for alternately cutting off an passing the electric field through apertures 25 in the grounded shield, towards which the field is deflected inwards. The motor 23 is electrically shielded so as to decrease the interference from the motor to the capacitor plate 26 that is suspended in the insulators 35. An alternating voltage proportional to the intensity of the electric field is generated in said plate by induction and is conducted through a shielded cable to a terminal 27 located in a junction box 33 that is grounded by means of a spike 31. The box 33 is also provided with a terminal 28 from the antenna, which latter is insulated at 29, as well as a terminal 30 for supplying current to the motor. A valve dissipator 34 is connected between the terminal 28 and the grounded box 33 for providing lightning protection for the antenna and input circuits, and said valve dissipator 34 may for example be designed such, that if the voltage between terminal 28 and box 33 exceeds 330 volts a short circuit to ground will occur as the result of a discharge in the valve dissipator. This may result in a current of as much as 50,000 amperes.

By making the metal casing 32 comprise a portion of the antenna has it not only become possible to protect the interior of the detector unit against the influence of the weather and the wind but also to give the combination of field detector and antenna substantially smaller dimensions than previously existing structures. Thus, in s practical case the combination of detector and antenna may for example have a total height of approximately 2 meters.

We claim:

1. A method for producing warning signals indicative of the severity and proximity of thunderstorms, said warning signals being classed as alert signals and alarm signals, comprising the steps of:
   a. measuring at least electric field intensity and electromagnetic radiation,
   b. generating alert signals in response to
      i. the measured electric field intensity exceeding a first predetermined value, or
      ii. the measured electromagnetic radiation exceeding a predetermined value, and
   c. generating alarm signals in response to:
      i. the measured electromagnetic radiation exceeding said predetermined value at least once during a first predetermined interval said first determined interval occuring after a second predetermined interval, said second predetermined interval being initiated in response to said electromagnetic radiation exceeding said predetermined value, or
      ii. the measured electromagnetic radiation exceeding said predetermined value simultaneously with the measured electric field intensity exceeding said first predetermined value, or
      iii. the measured electric field intensity exceeding a second predetermined value greater than said first predetermined value.

2. The method of claim 1 comprising the further steps of measuring optical radiation and generating alarm signals in response to the measured electromagnetic radiation exceeding said predetermined value simultaneously with the measured optical radiation exceeding a predetermined value.

3. A device for producing warning signals indicative of the severity and proximity of thunderstorms, said warning signals being classed as alert signals and alarm signals, said system including a detector for detecting a quasistatic electric field and a detector for detecting radio frequency electromagnetic radiation, the improvement comprising:
   first and second threshold discriminator means coupled to said electric field detector, each of said first and second discriminators transmitting an output signal only if the received electric field intensity exceeds the threshold level of the discriminator, said second discriminator having a higher threshold level than said first discriminator,
   an alert signal indicator, an alarm signal indicator, a first AND gate, and an OR gate, means for directly coupling said first discriminator means to said alert signal indicator ans to one input of said OR gate,
means for directly coupling said second discriminator means to said alarm signal indicator,
third threshold discriminator means coupled to said electromagnetic radiation detector,
means for coupling said third discriminator to one input of said first AND gate and to a time circuit, and
means for coupling the output of said time circuit to said alert signal indicator and to a second input of said OR gate, the output of said OR gate being coupled to a second input of said first AND gate, the output of said AND gate being coupled to said alarm signal indicator.

4. A device according to claim 3, wherein said time circuit comprises two monostable flip-flop circuits connected in series.

5. A device according to claim 3 further comprising an optical radiation detector, a fourth threshold discriminator means coupled to said optical radiation detector and a second AND gate, one input therefor being coupled to said fourth discriminator with a second input being coupled to said third discriminator means, the output of said second AND gate being coupled to said alarm signal indicator.

6. A device in accordance with claim 3 wherein said electric field and electromagnetic radiation detectors are separately grounded with respect to the ground connection of said first, second and third discriminator means, said time circuit, the OR gate and said first AND gate.

7. A device in accordance with claim 3 wherein said electric field detector is disposed in a metal casing connected to an antenna pipe so as to form a portion of an antenna.

8. A device in accordance with claim 5 wherein said optical radiation detector is disposed in a metal casing connected to an antenna pipe so as to form a portion of an antenna.

9. A device in accordance with claim 5 wherein said electric field detector and said optical radiation detector are disposed in a metal casing connected to an antenna pipe so as to form a portion of the antenna.

10. A device in accordance with claim 3 wherein said electric field detector comprises a capacitor as well as a rotating diaphragm in juxtaposition to said capacitor, with said diaphragm operating in accordance with a so-called field mill principle and with said diaphragm furthermore being disposed in a metal casing connected to an antenna pipe so as to form a portion of the antenna.